US008205258B1

(12) United States Patent
Chang et al.

(10) Patent No.: US 8,205,258 B1
(45) Date of Patent: Jun. 19, 2012

(54) METHODS AND APPARATUS FOR DETECTING WEB THREAT INFECTION CHAINS

(75) Inventors: Ming-Tai Chang, Taipei (TW); Casper Wang, Taipei (TW); Peng-Shih Pu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 309 days.

(21) Appl. No.: 12/627,152

(22) Filed: Nov. 30, 2009

(51) Int. Cl.
*G06F 11/00* (2006.01)
*G06F 12/14* (2006.01)
*G06F 12/16* (2006.01)
*G08B 23/00* (2006.01)
*H04L 29/06* (2006.01)
*G06F 11/30* (2006.01)
*G06F 15/16* (2006.01)

(52) U.S. Cl. .......... 726/22; 709/217; 709/219; 713/151; 713/152; 713/188; 726/23; 726/24

(58) Field of Classification Search .............. 726/22–24; 713/151, 152
See application file for complete search history.

(56) References Cited

U.S. PATENT DOCUMENTS

| | | | |
|---|---|---|---|
| 6,785,732 B1* | 8/2004 | Bates et al. | 709/232 |
| 2005/0005160 A1* | 1/2005 | Bates et al. | 713/200 |
| 2007/0006310 A1* | 1/2007 | Piccard | 726/24 |
| 2007/0016951 A1* | 1/2007 | Piccard et al. | 726/24 |
| 2007/0118903 A1* | 5/2007 | Bates et al. | 726/22 |
| 2007/0250928 A1* | 10/2007 | Boney | 726/24 |
| 2008/0047012 A1* | 2/2008 | Rubin et al. | 726/23 |
| 2008/0080518 A1 | 4/2008 | Hoeflin et al. | |
| 2008/0209552 A1* | 8/2008 | Williams et al. | 726/22 |
| 2009/0089857 A1* | 4/2009 | Sabin et al. | 726/1 |
| 2009/0144826 A2* | 6/2009 | Piccard | 726/24 |
| 2009/0254989 A1 | 10/2009 | Achan et al. | |
| 2009/0265786 A1* | 10/2009 | Xie et al. | 726/24 |

OTHER PUBLICATIONS

Oren Eli Zamir "Clustering Web Documents: a Phrase-Based Method for Grouping Search Engine Results", 1999 Thesis, pp. 1-208, University of Washington.
A. Blumer, et al. "Complete Inverted Files for Efficient Text Retrieval and Analysis", Jul. 1987, pp. 578-595, vol. 34, No. 3, Journal of the Association for Computing Machinery.
Fast flux—from Wikipedia, the free encyclopedia, 2 sheets [retrieved on Nov. 18, 2009], retrieved from the Internet: http://en.wikipedia.org/wiki/Fast_flux.
SpringerLink—Journal Article, 2 sheets [retrieved on Nov. 23, 2009], retrieved from the Internet: http://www.springerlink.com/content/t720711r28174513/?print=true.
Bioinformatics References / Help / EBI, 1 sheet [retrieved on Nov. 23, 2009], retrieved from the Internet: http://www.ebi.ac.uk/help/references.html.

* cited by examiner

*Primary Examiner* — Christian Laforgia
(74) *Attorney, Agent, or Firm* — Okamoto & Benedicto LLP

(57) ABSTRACT

Uniform resource locator (URL) patterns are found in browsing histories of client computers. The URL patterns are employed to find URL browsing chains for particular client computers. A URL browsing chain includes URL requests that match URL patterns arranged in sequential order by time stamp. The URL browsing chains may be normalized and then evaluated for web threat infection chains. URL browsing chains that are deemed to be web threat infection chains are built into a model. The model may be deployed locally in a client computer or in a remotely located server computer to detect web threat infection chains.

14 Claims, 10 Drawing Sheets

METHODS AND APPARATUS FOR DETECTING WEB THREAT INFECTION CHAINS

BACKGROUND OF THE INVENTION

1. Field of the Invention

The present invention relates generally to computer security, and more particularly but not exclusively to methods and apparatus for detecting web threat infection chains.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to herein as "viruses." Malicious codes have become so prevalent that experienced computer users have some form of antivirus in their computers. Antivirus for scanning data for malicious codes is commercially available from several vendors, including Trend Micro, Inc.

Web threats refer to malicious activities perpetrated over the Internet. A web threat may involve delivery of a virus by way of a malicious website. The malicious website may be a compromised legitimate website (e.g., infected or hijacked) or a website specifically configured for malicious purposes. A web threat may also involve a phishing site configured to imitate a legitimate website to fraudulently obtain confidential information from a user. A web threat may be triggered a variety of ways including by navigating to a malicious website, activating a link to a malicious website, and executing an executable file attachment of an email, to name a few examples.

The traditional approach to combating web threats involves compiling the addresses of known malicious websites, such as their DNS (Domain Name System) domain names and IP addresses, in a web reputation database. A web threat filtering service may consult the web reputation database to determine if a given IP address is that of a malicious website. Unfortunately, the inventors believe that emergence of more sophisticated web threats renders this traditional approach relatively ineffective.

SUMMARY

In one embodiment, uniform resource locator (URL) patterns are found in browsing histories of client computers. The URL patterns are employed to find URL browsing chains for particular client computers. A URL browsing chain includes URL requests that match URL patterns arranged in sequential order by time stamp. The URL browsing chains may be normalized and then evaluated for web threat infection chains. URL browsing chains that are deemed to be web threat infection chains are built into a model. The model may be deployed locally in a client computer or in a remotely located server computer to detect web threat infection chains.

These and other features of the present invention will be readily apparent to persons of ordinary skill in the art upon reading the entirety of this disclosure, which includes the accompanying drawings and claims.

Figure 1:
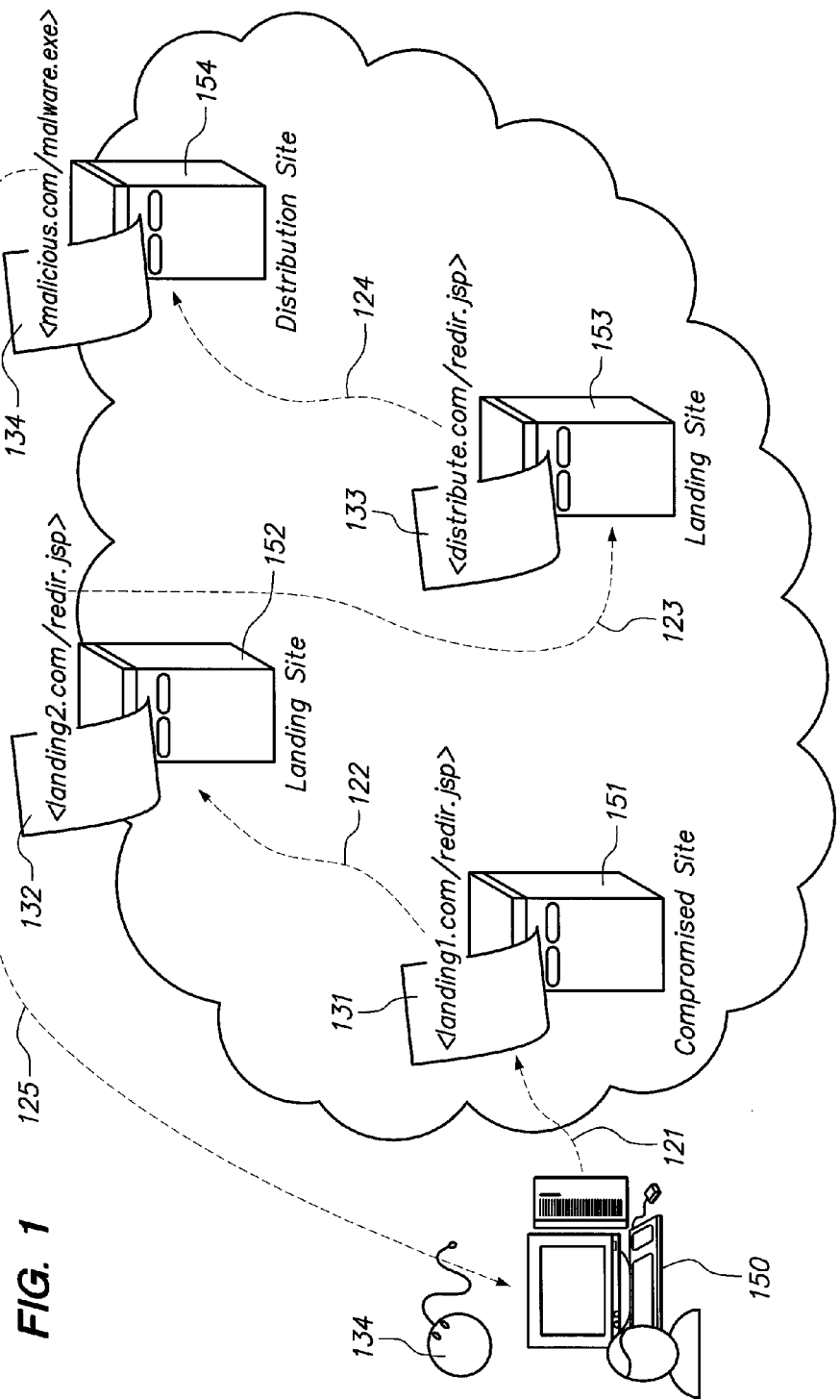
FIG. 1 shows an example web threat infection chain that may be detected by embodiments of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Web threats continually evolve and are designed to exploit particular targets. Web threats have become more technologically sophisticated, sometimes comprising multiple components and spawning numerous variants. Instead of hosting one malicious website and letting victims directly access that website, cyber criminals who perpetrate web threats build up complex chains of websites that begin from legitimate but compromised websites and go through one or more intermediate landing websites before finally ending on a malicious code delivery website. Worse, to make the attack vectors even more complex, cyber criminals exploit so-called "FastFlux" techniques to constantly and dynamically vary the DNS domain names and IP addresses of intermediate and ending websites to avoid detection by web threat filters.

A FastFlux network is a network of compromised computers, which are called botnets. A FastFlux network exploits dynamic DNS techniques to hide malicious code delivery sites behind an ever-changing network of compromised hosts acting as proxies. The purpose of a FastFlux network is for a DNS domain name (e.g., www.trendmicro.com) to have multiple IP addresses assigned to it. These botted IP addresses are registered and deregistered to and from the Fast flux network with extreme frequency and have a very short TTL (time-to-live) for any given DNS resource records. In addition, the DNS domain names used by the FastFlux network are also constantly changing from time to time and from attack to attack. The changing nature of the attack vectors prevents traditional IP-based or URL-based block lists from working.

An additional attack vector often used along with a Fast-Flux network is request redirection, which forms a URL (uniform resource locator) request chain. The compromised IP addresses in the URL request chain are not the final destination of the request. The compromised hosts are only used as redirectors that make malicious code delivery more resistant to discovery and counter-measure.

In the present disclosure, a "web threat infection chain" is defined as an ordered sequence of one or more web URL requests that lead to some malicious content. The malicious content may be a web page of a phishing site or malicious code, for example. The malicious content may be hosted by a malicious website (i.e., a website started and maintained for malicious purposes) or a compromised legitimate website. A website may be hosted by a server computer that communicates over the Internet.

A web threat infection chain normally starts from a legitimate yet compromised website, goes through one or more intermediate landing websites (mostly compromised hosts), and finally ends on a malicious code distribution website that is mostly invisible from the point of view of requesting clients. FIG. 1 shows an example web threat infection chain.

In the example of FIG. 1, a user on a client computer 150 (e.g., a desktop or laptop computer) uses a web browser to request a web page 131 from a compromised legitimate website 151 (see arrow 121). The website 151 may be a legitimate website doing business on the Internet, but have been infected by malicious code or hijacked (i.e., taken over) by a cyber criminal. The web page 131 has code for requesting another web page 132 hosted by a landing website 152 (see arrow 122). That is, when the web page 131 is received in the client computer 150, the client computer 150 will initiate a request for the web page 132. Similarly, the web page 132 has code for requesting a web page 133 hosted by a landing website 153 (see arrow 123). In turn, the web page 133 has code for requesting malicious code 134 hosted on the distribution website 154 (see arrow 124). This results in the malicious code 134 being delivered to the client computer 150 (see arrow 125) when the client computer 150 issues a request for the web page 133. The malicious code 134 may comprise a computer virus. Execution of the malicious code 134 on the client computer 150 would result in the client computer 150 getting infected. In this example, the web threat infection chain is the chain of URL requests that lead to the malicious code 134.

The inventors believe that current web threat filters are not very effective in detecting web threats that make use of infection chains. For one, the starting point of an infection chain may be a compromised legitimate website, which appears legitimate in web reputation databases. In addition, because most web threat infection chain attacks are perpetrated using FastFlux techniques, most of the URLs in the infection chain may not be reflected in the web reputation database. FastFlux techniques make the web reputation database constantly out-of-date, allowing the distribution website, which hosts the malicious content, to escape detection.

As will be more apparent below, embodiments of the present invention do not rely on detecting FastFlux networks directly. Instead, embodiments of the present invention exploit the behavior characteristics of FastFlux networks to detect existing or emerging web threat attacks. Embodiments of the present invention may use a state based approach and may learn from user browsing histories to identify suspicious URL requests. Embodiments of the present invention may automatically detect web threat infection chains without necessarily performing any prior analysis on or having knowledge of the content retrieved at the end of a URL request chain.

Embodiments of the present invention are now further described beginning with Table 1, which shows some examples of web threat infection chains:

TABLE 1

| 1) | uu1-1.cn/a0116159/a11.htm => user1.16-36.net/ms06014.css => cdn.e5c6a4.com/yun.exe |
| 2) | uu1-1.cn/a0116159/a11.htm => user1.16-36.net/ms06014.css => cdn.e5c6a4.com/upkk.exe |
| 3) | uu1-2.cn/a0114817/a11.htm => user1.20-40.net/ms06014.css => cdn.e5c6a4.com/up01.exe |
| 4) | cb.135lm.cn/tj.htm => hby007.cn/one/a1.htm => asp-3.cn/a31/ms06014.htm => down.hs7yue.cn/down/ko.exe |
| 5) | cb.216lm.cn/tj.htm => hby009.cn/one/a1.htm => asp-2.cn/a19/ms06014.htm => down.hs7yue.cn/down/ko.exe |

In the example of Table 1, the first infection chain starts at "uu1-1.cn/a0116159/a11.htm," goes to "user1.16-36.net/ms06014.css," then ends at "cdn.e5c6a4.com/yun.exe." The second infection chain starts at "uu1-1.cn/a0116159/a11.htm," goes to "user1.16-36.net/ms06014.css," and ends at "cdn.e5c6a4.com/upkk.exe." The third, fourth, and fifth infection chains follow the same pattern.

As shown in the example of Table 1, web threat attacks along infection chains may constantly change in different timeframe and for different victims. However, for a particular web threat attack, URLs at the same order on the infection chains are structurally similar or identical. Likewise, the associated infection chains themselves are also structurally similar or even identical. In embodiments of the present invention, the structural similarity of infection chains and URLs in infection chains is exploited by using unsupervised machine learning technology to automatically identify suspicious web threat infection chains from time stamped user Internet browsing histories.

Figure 2:
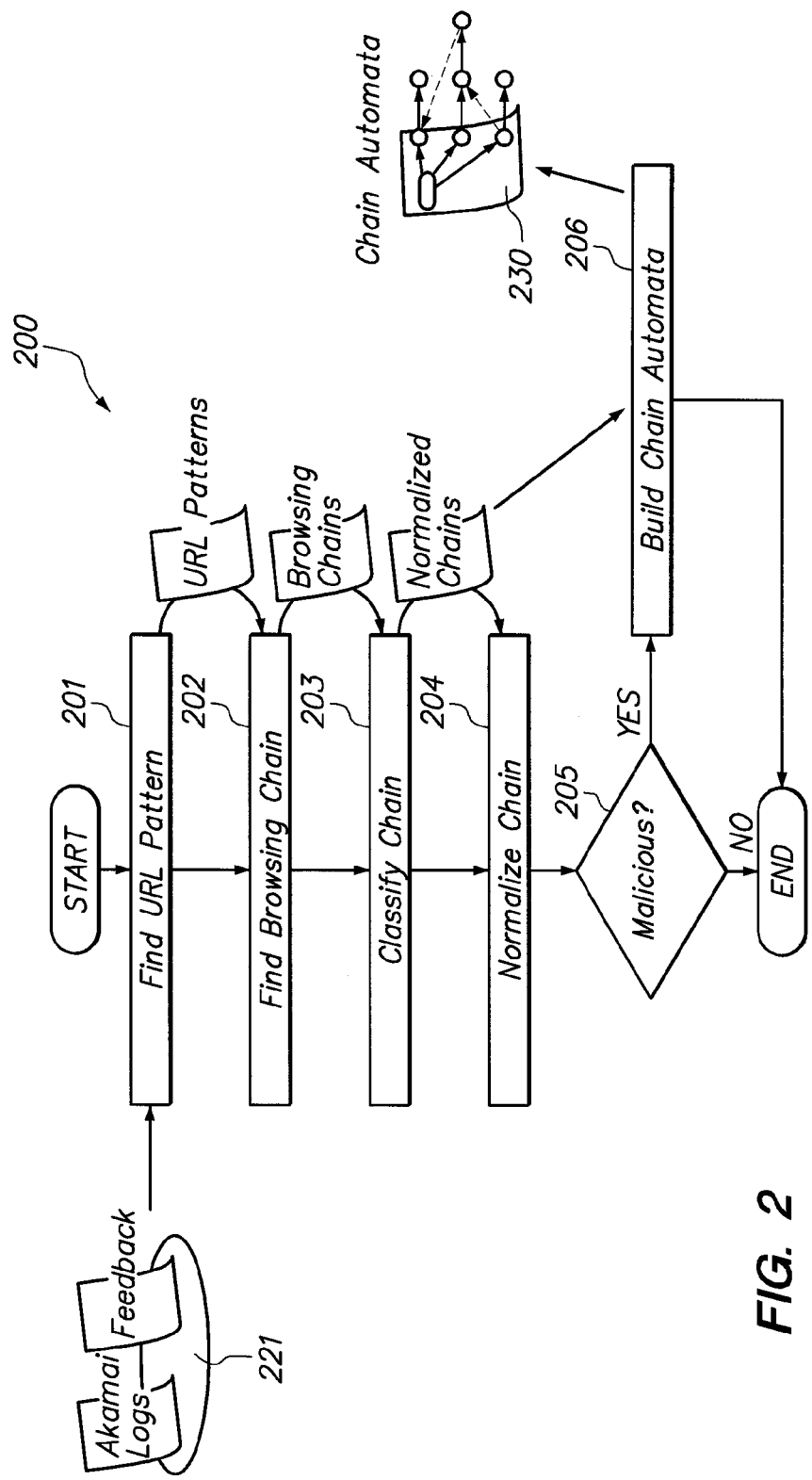
FIG. 2 shows a flow diagram illustrating a method of building a model for detecting web infection chains in accordance with an embodiment of the present invention.

FIG. 2 shows a flow diagram illustrating a method 200 of building a model for detecting web infection chains in accordance with an embodiment of the present invention. In one embodiment, the method 200 is performed by a computer that is maintained and operated by a computer security company providing a web threat filtering service.

The method 200 begins by finding URL patterns from a plurality of sample URL request chains in step 201. A URL request chain is a sequence of URL requests that begins from a user's client computer and ends on a landing site (i.e., the computer hosting the content that will be provided to the user's client computer). Computers between the initiating client computer and the final landing site are also referred to as "intermediate landing sites." The sample URL request chains may be from Internet web browsing histories (labeled as 221), which may be obtained from Akamai logs and feedbacks from web threat infection chain suffix automata deployed in the field (see FIG. 11, 912. Akamai logs comprise client requests logs of URL filtering service provided by Akamai Technologies, which is a content distribution network (CDN) vendor. Each log record contains multiple entries associated with a particular URL query request of a client. Some of the record entries are client IP address, time stamp, requesting URL domain name, requesting URL path, and other navigation information. From the Akamai logs for a given client, the method 200 may resolve the client's URL browsing history and URL sequence based on time stamp. Other suitable ways of collecting web browsing histories may also be employed without detracting from the merits of the present invention.

URLs of well known good and secure websites, such as google.com or yahoo.com, may be included in a white list. To cut down on the amount of data to be processed and to minimize noise, URL request chains that include URLs in the white list may be filtered out. To accommodate large amounts of data logs for higher processing throughputs, the process of finding URL patterns may be performed by distributed processing based on a domain's generic top level domain (gTLD) and country code top level domain (ccTLD).

Figure 3:
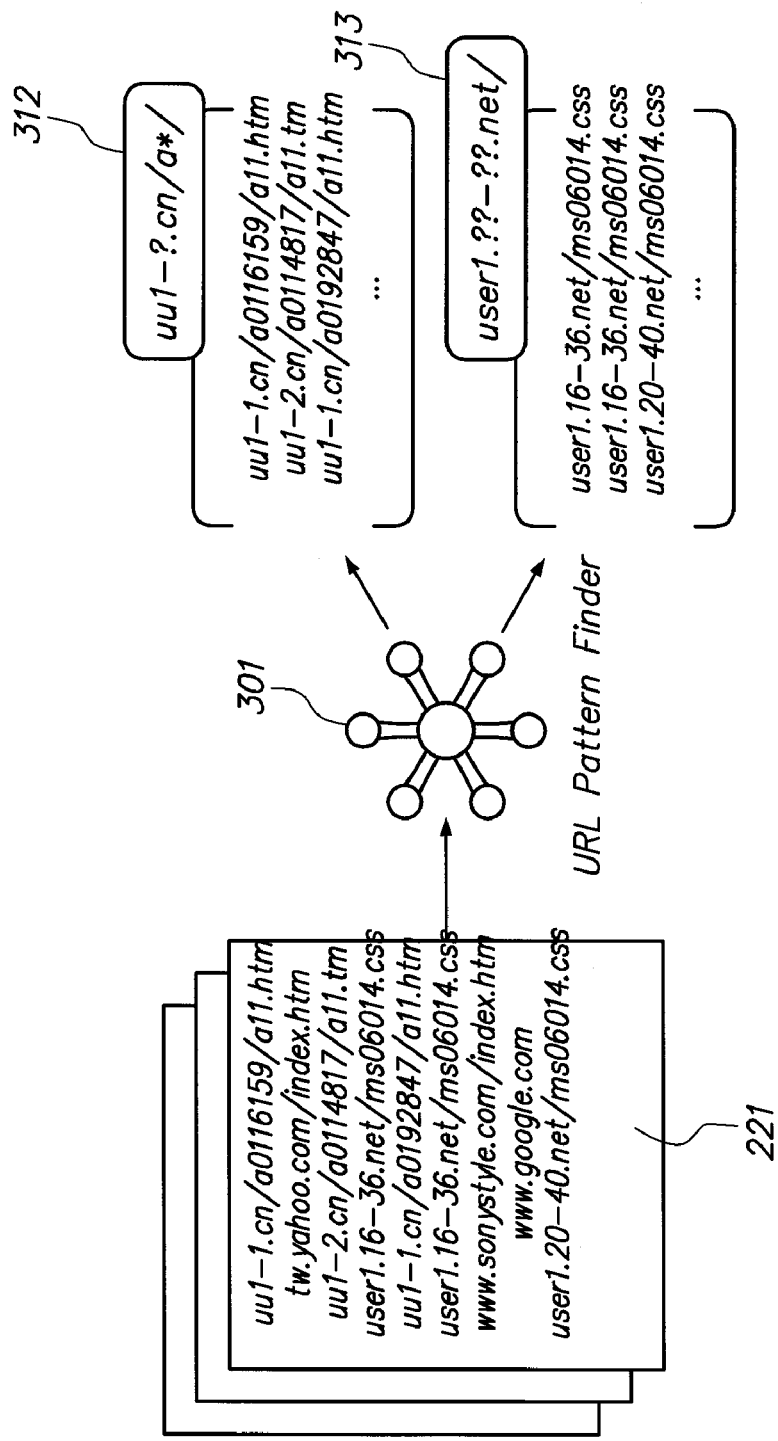
FIG. 3 schematically shows a URL pattern finder in accordance with an embodiment of the present invention.

FIG. 3 schematically shows a URL pattern finder in accordance with an embodiment of the present invention. The URL pattern finder may comprise computer-readable program code configured to find URL patterns in URL request chains. The URL pattern finder may perform step 201 of the method 200.

Although FastFlux networks are able to change landing sites easily, the URL of the landing sites needs to be automatically generated for scalable attacking. The URL pattern finder may be configured to reverse the URL auto-generation process to find the URL pattern that FastFlux networks employ. For example, the URL pattern finder may examine a plurality of URL request chains to find a URL pattern with constant elements and variable elements. The variable elements of a URL pattern are those elements that FastFlux networks vary when automatically generating the URL of landing sites. The constant elements are elements of the URL pattern that FastFlux networks do not change. The variable elements may be represented in the URL pattern by wildcards, for example. In one embodiment, the URL finder employs data clustering algorithms to extract URL patterns from the plurality of URL request chains. A URL pattern may be in regular expression form or locality sensitive hashing (e.g., Nilsimsa hash).

In the example of FIG. 3, the URL finder (labeled as 301) receives a plurality of URL request chains from web browsing histories (labeled as 221, which is also shown in FIG. 2). The URL finder extracts the URL patterns 312 and 313 from the URL request chains. For example, the URL pattern 312 comprises:

uu1-?.cn/a*/

In the URL pattern 312, the "uu1-" represents constant elements of the URL pattern.

This means that there is a group of URL request chains in the web browsing histories that has the same constant elements in the same position in chain. The FastFlux network does not vary these constant elements in their URL auto-generation process. The "?" following "uu1-" is a variable element, and represents a wildcard for a single character. This means that these elements vary among URL request chains in the same group. The FastFlux network varies the wildcard to automatically generate varying URLs for its landing sites. The "*" in the URL pattern 312 is a variable element representing a wildcard for several characters.

In step 202 of the method 200, the URL patterns generated in step 201 are used to find browsing chains. The URL pattern finder may also be configured to perform the step 202.

Figure 4:
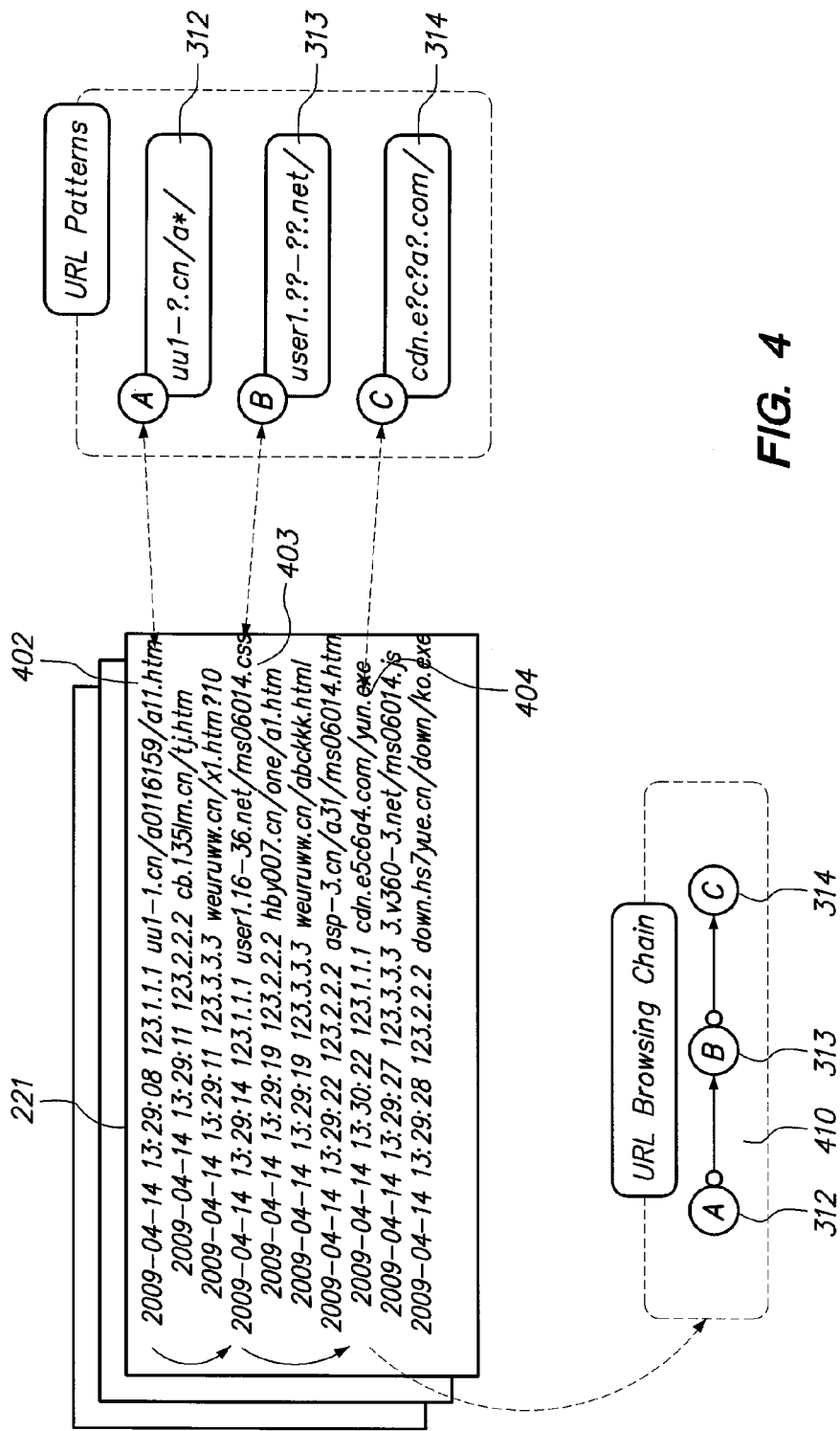
FIG. 4 schematically shows an example URL browsing chain generated from web browsing histories in accordance with an embodiment of the present invention.

A URL browsing chain of a client is a sequence of URL requests, in which each URL is replaced by a matching identified URL pattern. In one embodiment, each URL pattern is employed as a chain link in the URL browsing chain. The URL patterns may be arranged in the URL browsing chain in the order the client made the associated URL request. For example, for a particular client's web browsing chain, the URL patterns may be arranged in time stamp order, starting from the earliest and ending on the latest, as a chain of URL patterns. FIG. 4 schematically shows an example browsing chain 401 generated from web browsing histories (labeled as 221) in accordance with an embodiment of the present invention.

In the example of FIG. 4, a particular client (i.e., a client computer employed by a user) is identified in the browsing history by its IP address. As a particular example, a client with an IP address of 123.1.1.1 has initiated URL request chains labeled as 402, 403, and 404, in that order as indicated by time stamps. The URL patterns 312, 313, and 314 are found as matching the URL request chains 402, 403, and 404, respectively. The URL browsing chain 410 thus comprises sequential, time ordered URL patterns from a particular user's browsing history.

In step 203 of the method 200, the URL browsing chains generated in step 202 are normalized. The normalization of the browsing chains removes noise in the URL browsing chains. The noise may be the result of clients browsing more than one session at a time, resulting in a log that has combinations of different traversing histories. The noise may also be automatically added by the FastFlux network to result in random nodes in the URL browsing chain. The normalization of the URL browsing chains may be performed using multiple sequence alignment algorithms. Other suitable algorithms may also be employed without detracting from the merits of the present invention.

Figure 5:
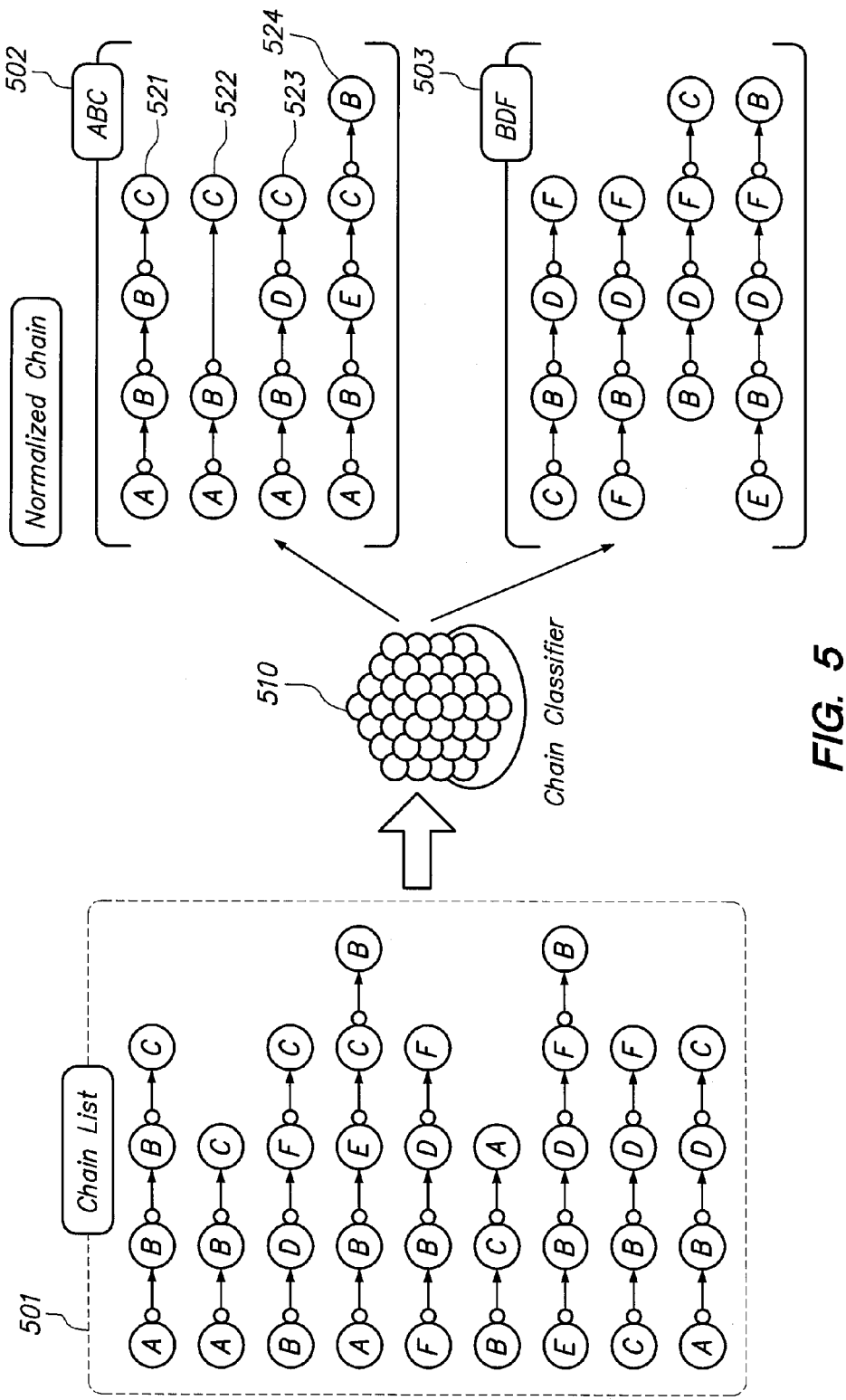
FIG. 5 schematically shows a chain classifier in accordance with an embodiment of the present invention.

FIG. 5 schematically shows a chain classifier (labeled as 510) in accordance with an embodiment of the present invention. The chain classifier may comprise computer readable program code for normalizing URL browsing chains. The chain classifier removes noise data from the URL browsing chains. The chain classifier may implement the step 203 of the method 200.

In the example of FIG. 5, the chain classifier receives URL browsing chains (labeled as 501) obtained from the step 202 of the method 200. The chain classifier may use multiple sequence alignment algorithm on the URL browsing chains to find the normalized URL browsing chains 502 and 503. In essence, the chain classifier groups multiple URL browsing chains into several normalized chain patterns that represent common browsing sequences.

In the example of FIG. 5, the normalized browsing chain 502 is obtained by alignment of the URL browsing chains 521, 522, 523, and 524. Note that the URL patterns "A", "B" and "C" are all present in the URL browsing chains 521-524. However, there are URL patterns "D" and "E" and sprinkling of additional URL pattern "B" in the URL browsing chains. Normalization of the URL browsing chains 521-524 reveals the normalized URL browsing chain 502, which has the sequence "A", "B", and "C", in that order. The normalized URL browsing chain 502 represents a browsing sequence common to all of the URL browsing chains 521-524.

In step 204 of the method 200, the normalized URL browsing chains from the step 203 are processed to determine if any of the normalized URL browsing chains is a web threat infection chain. Step 204 may be performed using a correlation framework that leverages existing web threat information. For example, the correlation framework may determine whether or not a normalized URL browsing chain is a web threat infection chain from IP addresses, domain reputation, DNS reputation, and other information that can be obtained from the normalized URL browsing chain.

Figure 6:
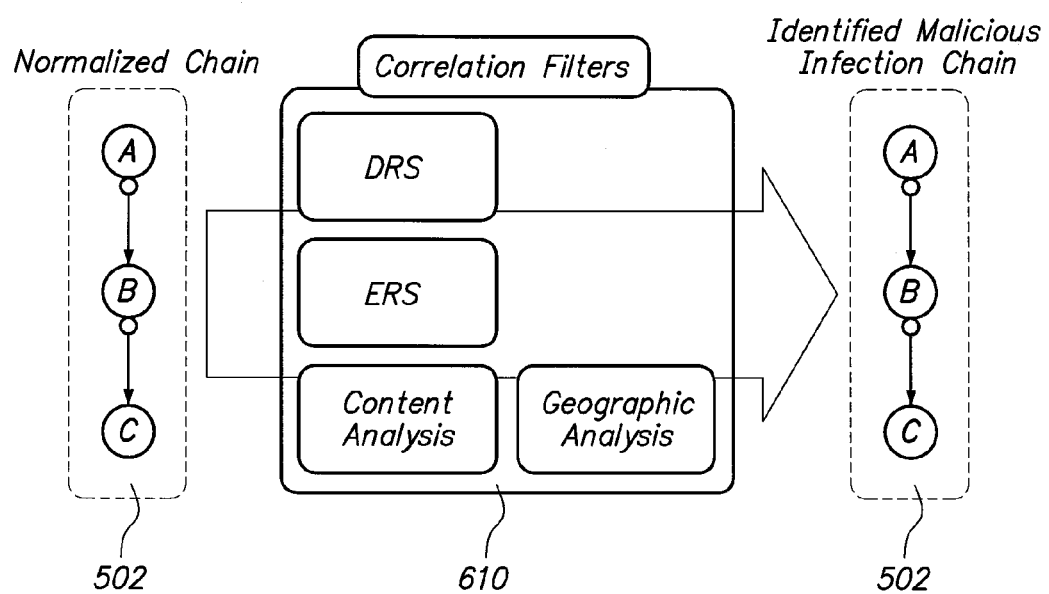
FIG. 6 schematically shows a correlation framework in accordance with an embodiment of the present invention.

FIG. 6 schematically shows a correlation framework in accordance with an embodiment of the present invention. In the example of FIG. 6, the correlation framework includes a plurality of correlation filters (labeled as 610) for determining whether or not a normalized URL browsing chain is a web threat infection chain. The correlation filters may make use of known detection techniques, such as domain reputation service (DRS), email reputation service (ERS), content analysis, and geographic analysis.

A domain reputation service assigns a reputation score to domains indicating the level of maliciousness by analyzing various domain attributes, such as registration time. Domain reputation service also includes IP reputation service. An Email reputation service assigns a reputation score to emails to indicate whether an email is spam or not by analyzing various email attributes, such as sender IP address. Email reputation service allows for determination on whether a URL domain is involved in spam activities. Content Analysis involves analysis of web page content to determine if a given web page contains malicious script or is itself malicious in nature. Geographic analysis involves determining if a domain is a FastFlux domain by checking the geographical distribution of resolved IP addresses.

In the example of FIG. 6, the normalized URL browsing chain 502 is analyzed using the correlation filters to determine that the normalized URL browsing chain 502 is a web threat infection chain.

While the normalized URL browsing chain 502 has been "identified web threat infection chain," other normalized URL browsing chains may be legitimate URL request chains, i.e., not web threat infection chains. As shown in step 205 to step 206 of the method 200, identified web threat infection chains (but not legitimate URL request chains) may be built into a web threat infection chain suffix automata (labeled as 230). The automata serve as a model that may be consulted to detect web threat infection chains as clients navigate to different websites.

Figure 7:
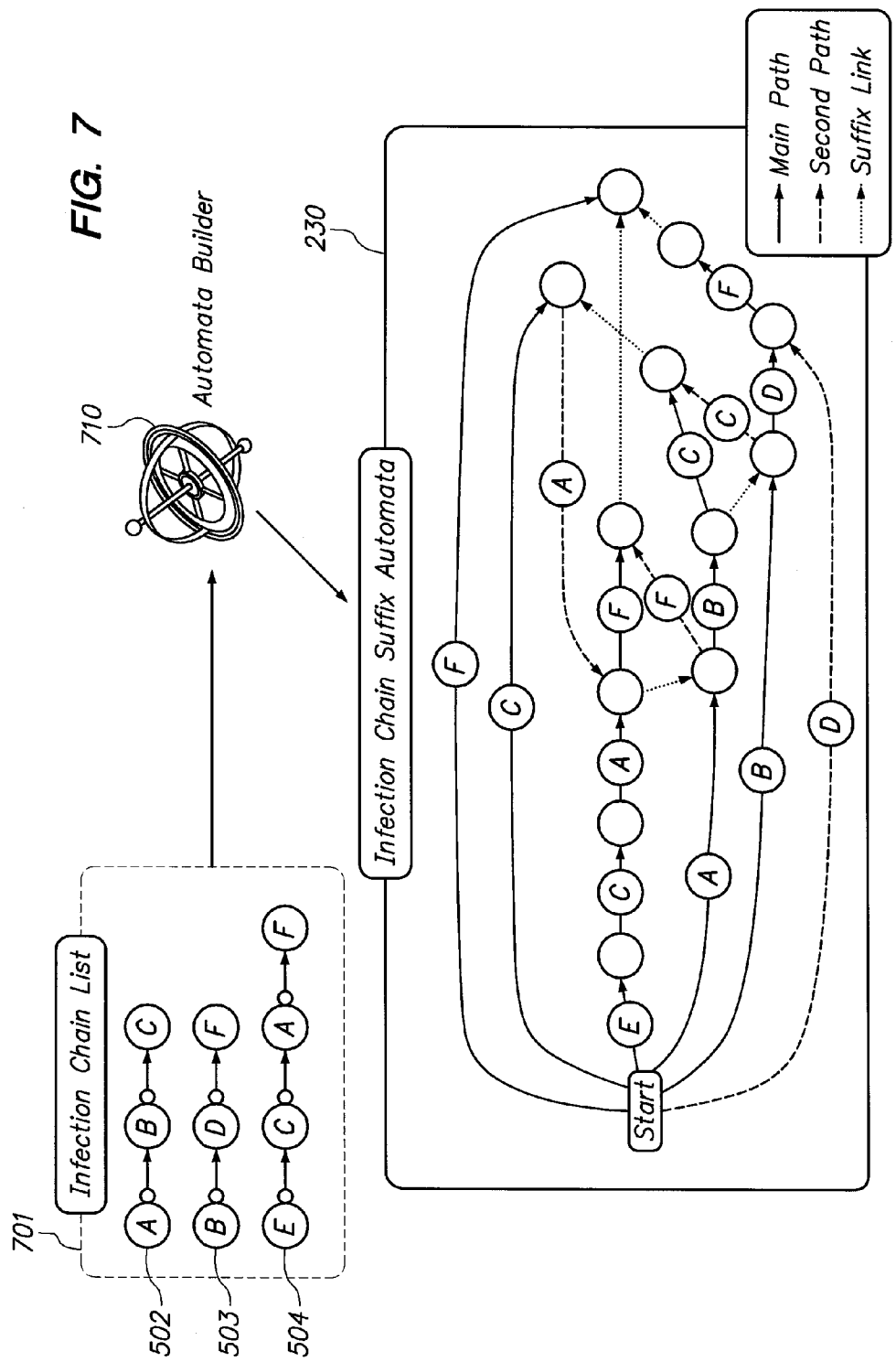
FIG. 7 schematically shows an automata builder in accordance with an embodiment of the present invention.

FIG. 7 schematically shows an automata builder in accordance with an embodiment of the present invention. The automata builder (labeled as 710) may comprise computer readable program code configured to build a web threat infection chain suffix automata 230 from normalized URL browsing chains that have been identified as web threat infection chains (labeled as 701). In the example of FIG. 7, the suffix automata represent the infected normalized URL browsing chains 502, 503, and 504. The automata builder 710 may incrementally build the suffix automata as more normalized URL browsing chains are identified as web threat infection chains. As time passes, the suffix automata will become more accurate in identifying web threat infection chains as more samples of web threat infection chains are identified. As can be appreciated, the suffix automata allow for discovery of web threat infection chain mutation.

Figure 8:
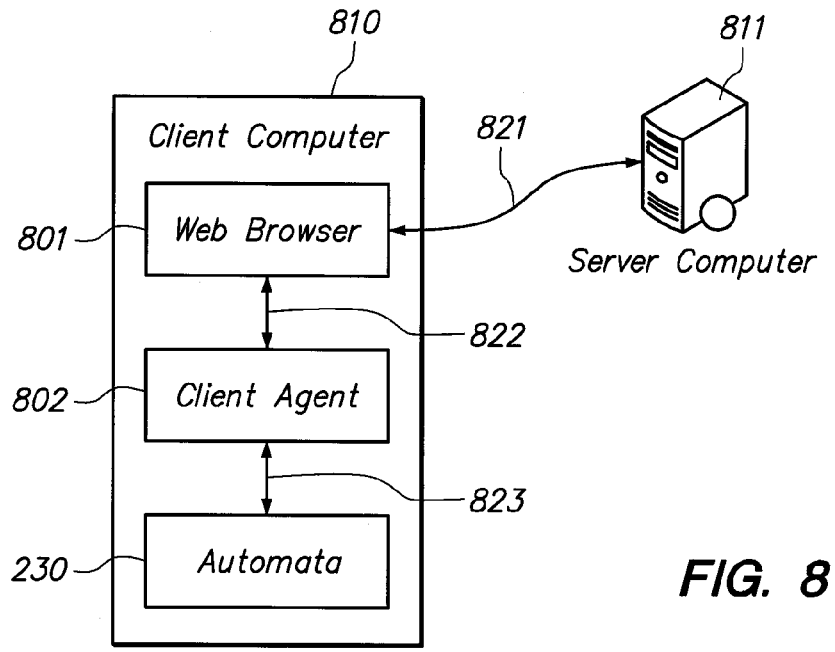
FIGS. 8 and 9 schematically show computer systems in accordance with embodiments of the present invention.
Figure 9:
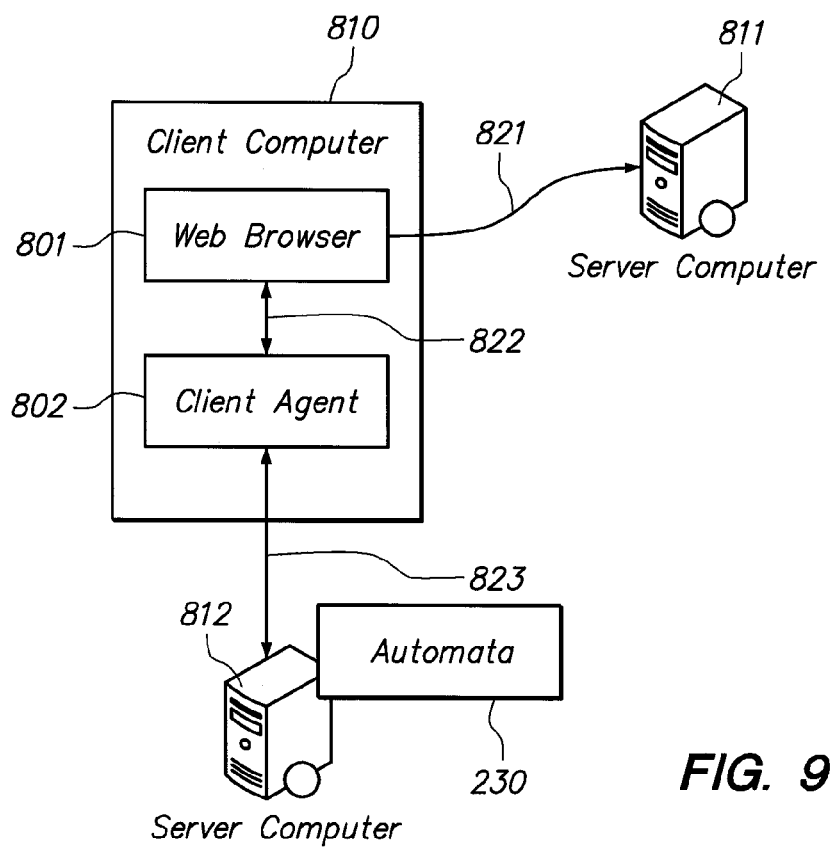

The web threat infection chain suffix automata may be deployed locally in a client computer or accessed over the cloud. FIGS. 8 and 9 show flow diagrams of computer systems illustrating deployment options for the suffix automata in accordance with embodiments of the present invention. In the example of FIG. 8, a client computer 810 includes computer-readable program code components in the form of a web browser 801, a client agent 802, and the web threat infection chain suffix automata 230. In the client computer 810, these computer-readable program code components may be loaded from a data storage device into main memory for execution by a processor. The web browser 801 may be employed by a user of the client computer 810 to navigate to websites on the Internet. In the example of FIG. 8, the web browser 801 communicates with a server computer 811 (see arrow 821) to request contents, such as web pages. The web browser 801 communicates with other server computers (not shown) on the Internet to access websites.

The client agent 802 may comprise-computer-readable program code configured to monitor the browsing activity of the user (see arrow 822). The client agent 802 may be configured to keep track of Internet communication sessions of the client computer 810, including websites visited, documents received, and so on. The client agent 802 may comprise a client-based antivirus program, for example. In the example of FIG. 8, the automata 230 are locally stored in the client computer 810. The automata 230 may be updated incrementally, from time to time to include information on new web threat infection chains as part of the update process of the client agent 802. As the client computer 810 navigates on the Internet, the client agent 802 receives navigation information and passes it to the automata 230 (see arrow 823). The automata 230 keep track of URL requests made by the client computer 810 and send an alert when the client computer makes a series of URL requests that match a web threat infection chain. The alert may be a warning message box displayed to the user, blocking access to a malicious site, and so on.

The example of FIG. 9 is the same as the example of FIG. 8 except that the automata 230 run on a remotely located server computer 812 providing in-the-cloud web threat filtering service to the client computer 810. The client agent 802 and the automata 230 communicate over a computer network, such as the Internet. The operational steps represented by arrows 821, 822, and 823 are the same except that instead of locally accessing the automata 230, the client agent 802 passes the navigation information of the client computer 810 to the automata 230 in the server computer 812.

Figure 10:
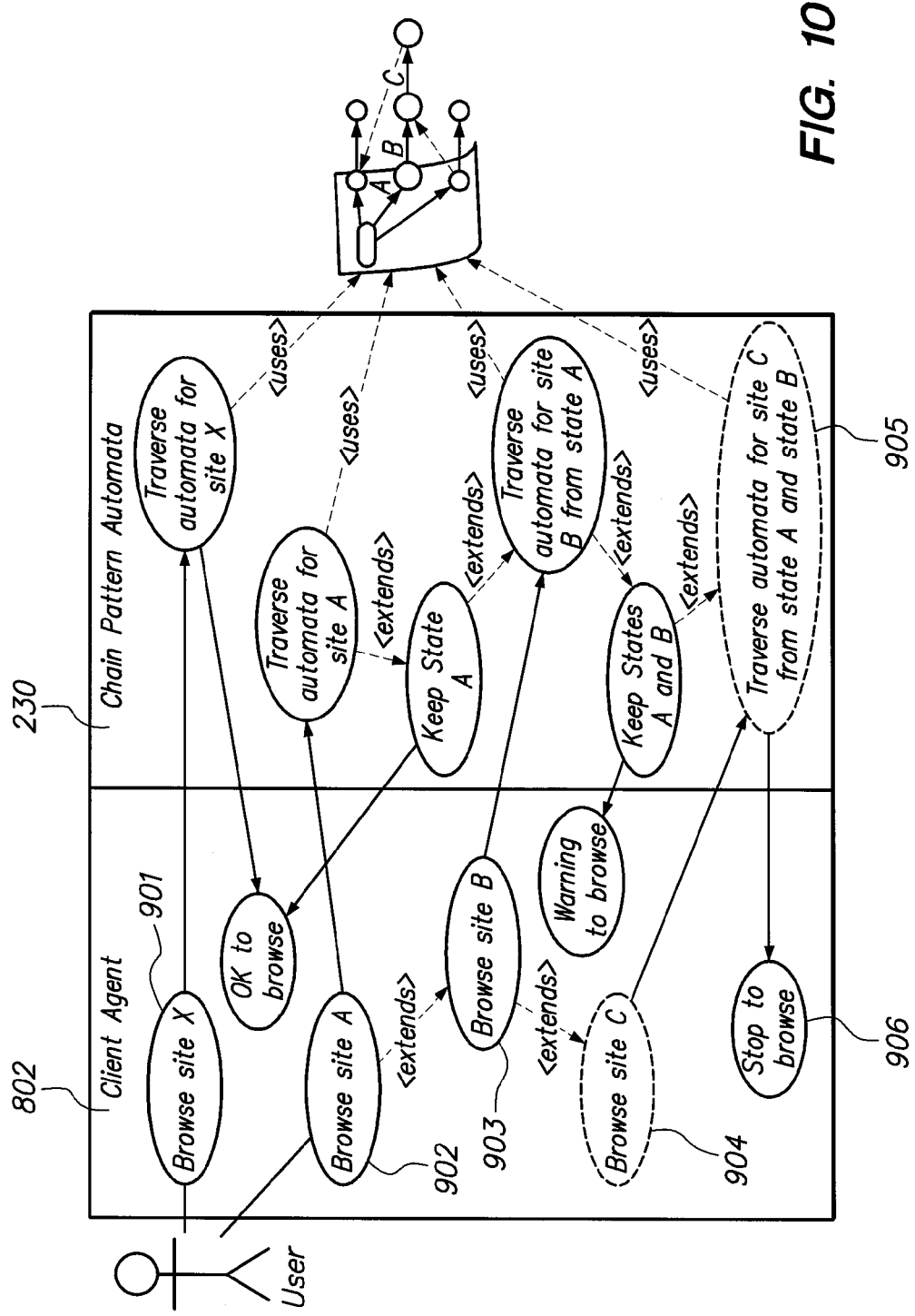
FIGS. 10 and 11 show flow diagrams schematically illustrating operations of a client agent and automata in accordance with embodiments of the present invention.

FIG. 10 shows a flow diagram schematically illustrating the operation of the client agent 802 and the automata 230 in accordance with an embodiment of the present invention. The example of FIG. 10 is for the case of the automata 230 detecting a known web threat infection chain. In the example of FIG. 10, the client agent 802 detects that the user browses website X (see 901). Traversing the automata 230 for the website X indicates that website X is not a node of a web threat infection chain. The client agent 802 then detects that the user browses website A (see 902). Traversing the automata 230 for the website A indicates that the website A is potentially a node of a web threat infection chain because there is a web threat infection chain that goes from the website A, to the website B, and then to the website C. At this point, the automata 230 keeps a state that it has found A, and waits for the websites B and C. The user then browses the website B (see 903) then the website C (see 904), in that order. Traversing the automata for website C from the websites A and B shows that the user's client computer is following a web threat infection chain (see 905). The automata 230 so informs the client agent 802 to warn the user or perform other responsive actions, such as blocking the websites A, B, and C so that the user's client computer cannot or will not access them.

Figure 11:
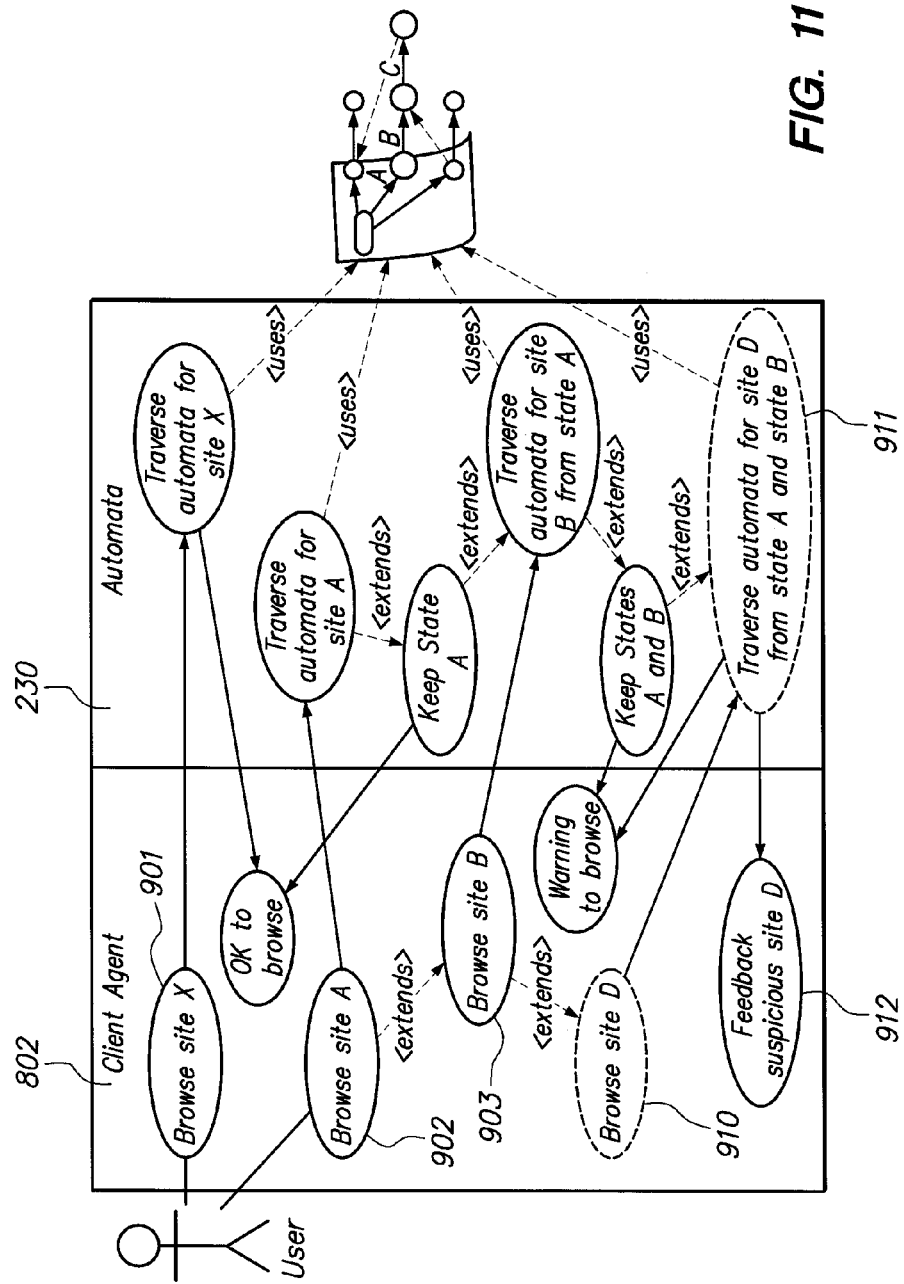

FIG. 11 shows a flow diagram schematically illustrating the operation of the client agent 802 and the automata 230 in accordance with an embodiment of the present invention. The example of FIG. 11 is for the case of the automata 230 detecting an unknown, but suspicious URL request chain. The flow diagram of FIG. 11 is similar to FIG. 10 from the user's browsing of the website X (step 901), then website A (see 902), then website B (see 903). In FIG. 11, instead of browsing the website C, the user browses the website D (see 910). Although the automata 230 do not have information on a web threat chain infection that goes from website A, to website B, to website D, the just mentioned sequence of nodes is very similar to the web threat chain infection of website A, to website B, to website C (see 911). Because the automata 230 is configured to detect for URL request chains that are very similar (e.g., off by only one node) to known web threat infection chains, the automata 230 sends a feedback to the client agent 802 that the website D is suspicious. In response, the client agent 802 may warn the user of the potential web threat chain infection. The client agent 802 may forward the feedback to the server computer where the automata 230 is built for input into method 200 as part of browsing histories (see 221 in FIG. 2). If the URL request chain from website A, to website B, to website D is confirmed to be a web threat infection chain after processing through the method 200, this new web threat infection chain will be incorporated in the next build of the automata 230. As can be appreciated, this feedback process allows the automata 230 to adapt to mutation of web threat infection chains.

Methods and apparatus for detecting web threat infection chains have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method for performing computer security, the method comprising:
   a first computer receiving a plurality of browsing histories comprising uniform resource locator (URL) requests made by client computers to access websites on the Internet;
   the first computer finding a plurality of URL patterns from the browsing histories, each of the URL patterns comprising variable elements and constant elements, the constant elements remaining constant and in a same position in a group of URL request chains in the browsing histories;
   the first computer finding URL browsing chains having a first URL that matches a first URL pattern in the plurality of URL patterns, each of the URL browsing chains being for a particular client computer and comprising the first URL and a second URL sequentially arranged in time stamp order, the second URL matching a second URL pattern in the plurality of URL patterns;
   the first computer generating normalized URL browsing chains by normalizing the URL browsing chains to remove noise data from the URL browsing chains;
   the first computer identifying web threat infection chains from the normalized URL browsing chains, the web threat infection chains comprising a series of ordered URL requests that lead to malicious content;
   the first computer building a model for detecting web threat infection chains using the identified web threat infection chains;
   a second computer receiving the model built by the first computer; and
   the second computer detecting a web threat infection chain in the second computer by identifying a sequence of different URLs accessed at different times from the second computer and accessed in a time ordered sequence as indicated in the model.

2. The method of claim 1 wherein the model comprises suffix automata.

3. The method of claim 1 wherein the malicious content comprises a computer virus.

4. The method of claim 1 wherein the variable elements are represented by wildcards in a URL pattern.

5. A computer-implemented method of detecting web threat infection chains, the method comprising:
   a first computer finding a first uniform resource locator (URL) pattern and a second URL pattern among URL requests included in Internet web browsing histories of client computers;
   the first computer finding a URL browsing chain for a client computer, the URL browsing chain including a first URL request that includes a URL matching the first URL pattern and a second URL request the includes another URL matching the second URL pattern, the first and second URL patterns being sequentially ordered in the URL browsing chain in the order the client computer made the first URL request and the second URL request;
   the first computer building a model that includes information from the URL browsing chain when the URL browsing chain leads to malicious content;
   a second computer receiving the model built by the first computer; and
   the second computer detecting a web threat infection chain in the second computer by identifying a sequence of different URLs accessed at different times from the second computer and accessed in a time ordered sequence as indicated in the model.

6. The method of claim 5 wherein the model comprises suffix automata.

7. The method of claim 5 wherein the malicious content comprises a computer virus.

8. A computer system comprising:
   a first server computer hosting a website; and
   a client computer operated by a user to communicate with the first server computer using a web browser running on the client computer, the client computer being configured to consult a module to detect a web threat infection chain, the web threat infection chain being detected by monitoring a time ordered sequence of different uniform resource locator (URL) requests made by the client computer to the first server computer and other server computers on the Internet at different times and comparing the URL requests to URL patterns incorporated in the model, and determining a web threat infection chain exists when the time ordered sequence of visited URLs matches a time ordered sequence of URLs incorporated in the model.

9. The computer system of claim 8 wherein the model comprises suffix automata.

10. A computer-implemented method of detecting web threat infection chains, the method comprising:
   a client computer detecting navigation of a web browser to a first website at a first instance in time, the first website having a first uniform resource locator (URL);
   the client computer detecting navigation of the web browser to a second website at a second instance in time after the first instance in time, the second website having a second URL different from the first URL;
   the client computer detecting navigation of the web browser to a third website at a third instance in time after the second instance in time, the second website having a third URL different from the second URL and the first URL;
   the client computer comparing a web browsing chain to a plurality of web threat infection chain patterns, the web browsing chain comprising a time ordered sequence having the first URL followed by the second URL and the second URL followed by the third URL, each of the web threat infection chain patterns comprising a time ordered sequence of different URL patterns; and the client computer detecting that the web browsing chain leads to malicious content when the web browsing chain matches a web threat infection chain pattern in the plurality of web threat infection chain patterns, the web threat infection chain pattern comprising a pattern for the first URL, the second URL, and the third URL in a same time ordered sequence as the web browsing chain comprising the first URL, the second URL, and the third URL.

11. The method of claim 10 wherein the plurality of web threat infection chain patterns are part of a model.

12. The method of claim 11 wherein the model comprises suffix automata.

13. The method of claim 10 wherein the third URL points to a malicious content.

14. The method of claim 13 wherein the malicious content comprises a computer virus.

* * * * *